United States Patent [19]

Miller et al.

[11] Patent Number: 5,363,750

[45] Date of Patent: Nov. 15, 1994

[54] PASTA PAN AND COOKING METHOD

[75] Inventors: Danny T. Miller, Metamora; Robert Viviano, Plymouth, both of Mich.

[73] Assignee: Little Caesar Enterprises, Inc., Detroit, Mich.

[21] Appl. No.: 116

[22] Filed: Jan. 4, 1993

[51] Int. Cl.⁵ .............................................. A47J 43/18
[52] U.S. Cl. ....................................... 99/426; 99/416; 99/448; 99/450
[58] Field of Search .................. 99/426, 422, 425, 410, 99/415, 416, 417, 418, 444, 445, 448, 450, DIG. 15

[56] References Cited

U.S. PATENT DOCUMENTS

| | | | |
|---|---|---|---|
| D. 249,917 | 10/1987 | Collins | D7/3 |
| D. 281,480 | 11/1985 | McClelland | D7/356 |
| 462,929 | 11/1891 | Long . | |
| 1,519,510 | 12/1924 | Santarsiero | 99/416 |
| 2,932,293 | 4/1960 | Rassieur . | |
| 3,786,741 | 1/1974 | Plumley et al. | 99/450 |
| 3,799,048 | 3/1974 | Finley | 99/415 |
| 3,808,963 | 5/1974 | Ludena | 99/417 |
| 3,899,962 | 8/1975 | Federico | 99/450 |
| 3,946,893 | 3/1976 | Bowersmith | 220/13 |
| 4,186,217 | 1/1980 | Tchack | 426/523 |
| 4,204,609 | 5/1980 | Kuhn | 220/408 |
| 4,216,241 | 8/1980 | Thompson | 99/448 |
| 4,216,763 | 8/1980 | Miklas | 99/426 |
| 4,348,421 | 9/1982 | Sakakibara et al. | 426/394 |
| 4,462,308 | 7/1984 | Wang . | |
| 4,528,975 | 7/1985 | Wang . | |
| 4,643,312 | 2/1987 | Zarges | 206/514 |
| 4,803,088 | 2/1989 | Yamamoto et al. | 426/107 |
| 4,908,487 | 3/1990 | Sarnoff et al. | 99/448 |
| 5,189,945 | 3/1993 | Hennick | 99/416 |

FOREIGN PATENT DOCUMENTS 0007106 of 1896 United Kingdom .................. 99/416

Primary Examiner—Timothy F. Simone
Assistant Examiner—James F. Hook
Attorney, Agent, or Firm—Oblon, Spivak, McClelland, Maier & Neustadt

[57] ABSTRACT

A pasta pan and cooking method is provided which is particularly suitable for preparing an entree which includes two or more components, with the pan assembly allowing the components to be cooked simultaneously. For cooking a pasta and sauce dish, pasta can be disposed in an apertured pan, with sauce disposed in a non-apertured pan. Both the pasta pan and the sauce pan are disposed in an outer pan which includes a small portion of water in the bottom thereof. The pans are covered and inserted into an oven for simultaneous cooking of two or more components of an entree, such as pasta and sauce, simultaneously.

28 Claims, 6 Drawing Sheets

PASTA PAN AND COOKING METHOD

BACKGROUND OF THE INVENTION

1. Field of the Invention

The invention relates to a pan assembly and cooking method which provides for simultaneous cooking of two food portions, for example, portions which are to be combined after cooking to form an entree. Although a primary purpose of the invention is the simultaneous preparation of pasta and sauce, it is to be understood that the pan and method could also be utilized for a wide variety of entrees or recipes.

2. Discussion of Background

Fast food restaurants enjoy continued popularity due to their convenience and ability to provide food rapidly at a relatively low cost. A number of food products are currently available in fast food restaurants, such as hamburgers, chicken and pizza. Such food products are suitable for fast food restaurants due to their popularity, as well as the ability to easily prepare such foods by busy, often inexperienced, employees. Even though a variety of food products are available in fast food restaurants, customers, particularly frequent customers, can become bored by the relatively few choices. In addition, often customers will dine in a group, making it difficult to select a restaurant, for example if one or more persons of the group had already eaten a particular fast food earlier that day or the preceding day. Accordingly, new food products which can be prepared in a fast food restaurant are quite desirable.

Pasta dishes enjoy wide-spread popularity due to their pleasing taste as well as the more recent recognition of pasta dishes as an important nutritional component of a balanced diet. Some restaurants have attempted to provide pasta dishes in a semi-fast food context. For example, sometimes stands or small restaurants will have a number of wire net type pans which can be readily immersed for cooking pasta. The chef monitors the pasta, and thereafter adds a sauce, often which is contained in a large pot sufficient for a number of pasta servings. However, such an arrangement is often time-consuming for the chef, requiring constant monitoring, and only a limited number of customers can be accommodated at a particular time. Thus, such arrangements are labor intensive, and can cause a delay in serving the customer. In addition, where a large sauce quantity is utilized for a number of pasta dishes, the sauce can become unpleasant if it has been heated over an extended period of time. Such arrangements are also inconvenient from a clean-up standpoint.

Accordingly, a cooking assembly and method is desirable which can be utilized in fast food restaurants and which can provide for simultaneous cooking of a plurality of ingredients or components of a food dish, for example pasta and sauce. Such an arrangement should be able to provide for rapid cooking with a relatively little amount of skill and time required on the part of the fast food employee. In addition, such arrangements should provide for relatively easy clean-up, as well as convenience in handling of the utensils utilized for preparation of the pasta dish.

SUMMARY OF THE INVENTION

Accordingly, it is an object of the present invention to provide a pan assembly and cooking method which can allow for simultaneous and convenient cooking of two or more ingredients of an entree or food dish.

It is another object of the present invention to provide a pan assembly and cooking method which allows for simultaneous cooking of pasta and sauce, with the assembly convenient for use in fast food restaurants.

It is a further object of the present invention to provide a pan assembly and cooking method which is suitable for cooking entrees having plural components simultaneously, with the components maintained separate during cooking and then combined after cooking, and with the simultaneous cooking providing for proper preparation of each component.

It is a still further object of the present invention to provide a pan assembly and cooking method which allows for simultaneous preparation of plural components of a food entree or dish, in which the components can be prepared simultaneously in a pizza oven.

These and other objects and advantages are attained in accordance with the present invention which provides a pan assembly and cooking method in which first and second insert pans are provided within an outer pan, with each insert pan utilized for cooking a different component of an entree. In preparation of a pasta dish, pasta is placed in one of the insert pans, with sauce provided in the other insert pan. The insert pans are placed in the outer pan, and a small amount of water is provided in the bottom of the outer pan. The pasta insert pan includes a plurality of holes extending therethrough, such that the small amount of water becomes vaporized and steams the pasta during cooking. After the insert pans and water are placed inside the outer pan, a cover is placed over the outer pan, and the assembly is placed in an oven for cooking. Although a primary objective of the present invention resides in providing a pan assembly which is suitable for fast food cooking, restaurants other than fast food restaurants may also find the present invention desirable, and the pan assembly could also be utilized for home use. Particularly in fast food applications, each of the components of the pan assembly are formed such that they are readily stackable, thereby allowing a large number of pans to be conveniently retained for serving a large number of customers.

BRIEF DESCRIPTION OF THE DRAWINGS

A more complete appreciation of the present invention and many of the attendant advantages thereof will become readily apparent from the following detailed description, particularly when considered in conjunction with the drawings in which.

DESCRIPTION OF THE PREFERRED EMBODIMENTS

Figure 1:
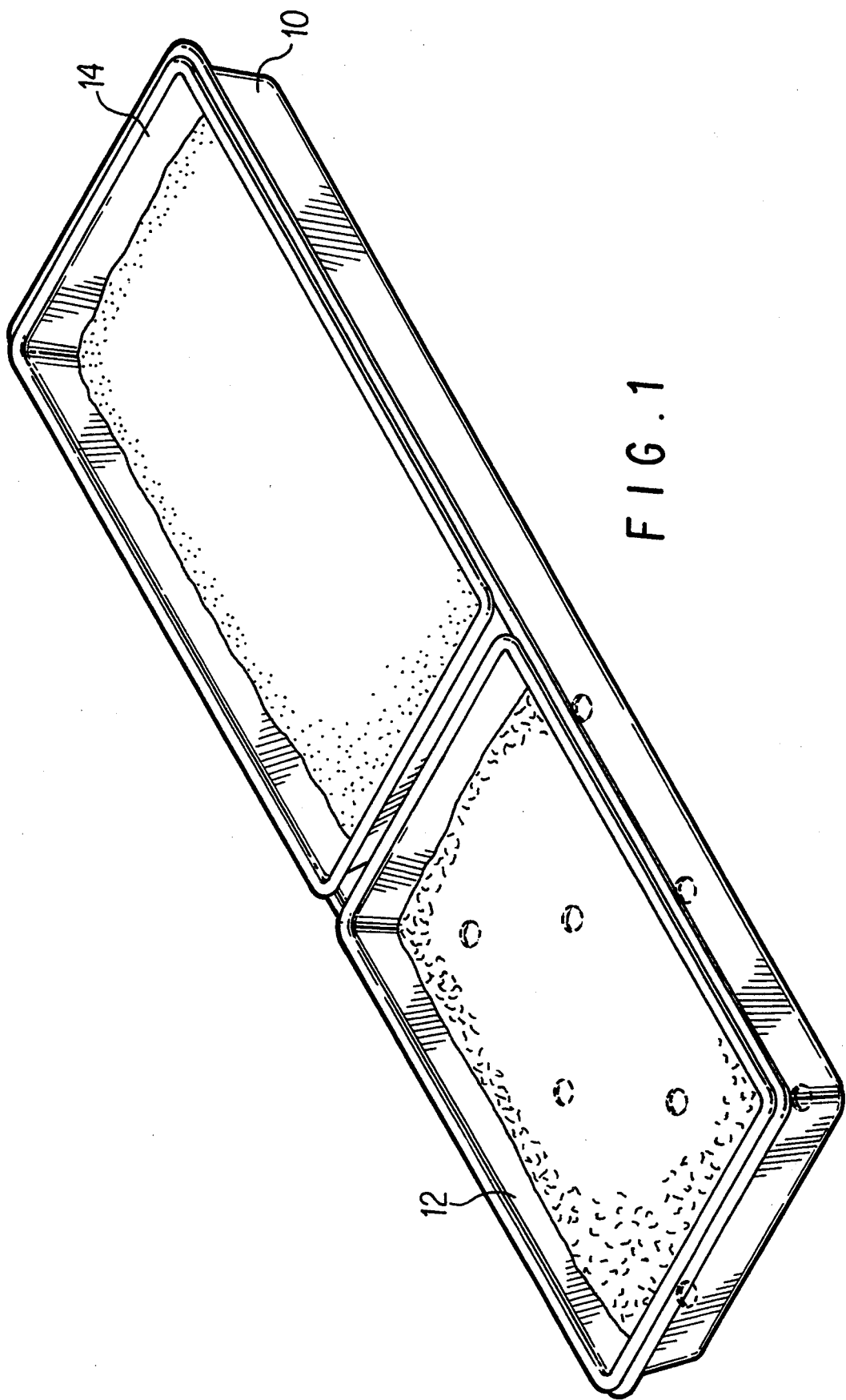
FIG. 1 is a perspective view of the pan assembly and method of the present invention with the cover omitted.

FIG. 1 shows a perspective view of the pan assembly utilized in accordance with the present invention. As shown in FIG. 1, the assembly includes an outer pan 10 which receives first and second insert pans 12, 14. As shown in FIG. 1, the first insert pan 12 can be utilized for cooking noodles, such as pasta noodles, with the second insert pan 14 utilized for preparing a sauce which can later be combined with the noodles after cooking. Although a primary objective resides in the preparation of pasta and sauce, it is to be understood that the present invention is applicable to a number of different foods or entrees as well. For example, a similar arrangement can be utilized for cooking a lo mein dish, or a rice and sauce dish. In addition, it may also be possible to use more than two insert pans, for example if it is desirable to prepare an entree including more than two primary components.

Figure 2A:
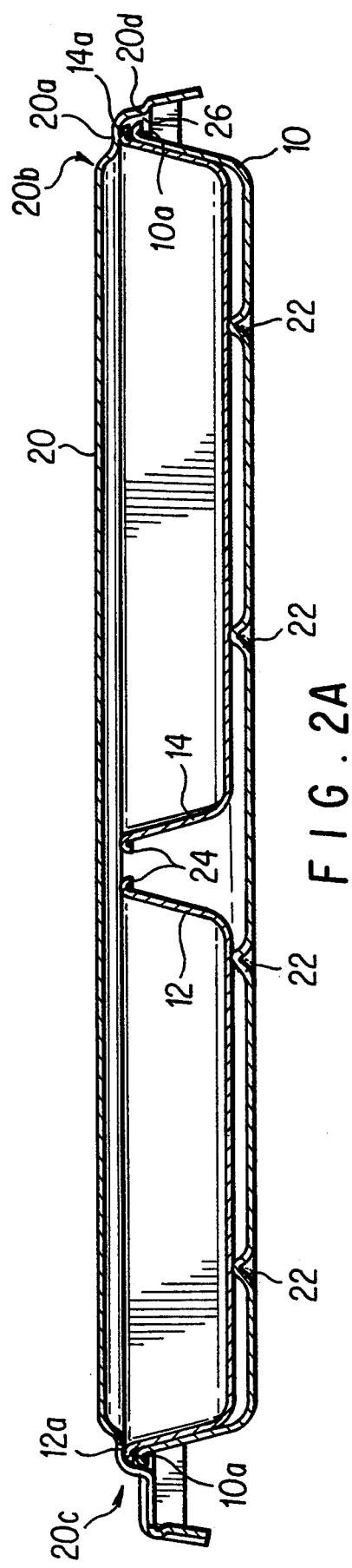
FIGS. 2 A and B are side, cross-sectional views of the pan assembly of the present invention.

FIG. 2A shows a side, cross-sectional view of the pan assembly including a cover or lid 20 which covers the entire assembly. As shown in FIG. 2A, the insert pans 12, 14 are received in the outer pan 10, with the outer pan including an arrangement to provide for spacing of the lower surfaces of the insert pans from the inner bottom surface of the outer pan 10. In particular, a plurality of dimples 22 are provided in the bottom surface of the outer pan or carrier pan 10 for maintaining a spaced relationship between the inner bottom surface of the outer pan 10 and the bottom surfaces of the insert pans 12, 14. As also shown in FIG. 2A, the lips or rims of the insert pans 12a, 14a can also extend over a lip or rim of the carrier pan 10a. This can provide an additional support for the insert pans, and may be used in addition to, or as an alternative to the dimples 22. The inclined relationship of the outer pan walls with respect to the inner pan walls can also be designed to provide spacing between the lower pan surfaces.

As also shown in FIG. 2A, the cover 20 includes a surface 20a which provides for sufficient enclosing of the outer pan and insert pans. Although the cover 20 could be substantially flat, a domed surface 20b can also be provided, which minimizes contact of the cover with the food products being cooked, and can even allow for heaping portions to be placed in one or more of the insert pans, while preventing the portions from sticking to the lid 20.

The cover also includes an aperture 20c at one end thereof, which allows the pans to be grasped without removal of the lid. This can be important in the fast food context, such that the entire assembly can be removed from an oven, for example by utilizing grippers conventionally used for pizza pans. Further in this regard, the insert pans 12, 14 are preferably sized with respect to the outer pan 10, such that a space can be provided between the pans as shown at 24. Thus, the person handling the pans can insert a pizza gripper through the aperture 20c, and the gripper will move the lip 12a of the insert pan 12 in a rightward direction in FIG. 2A, such that the edge of the outer pan 10 can be readily gripped with pizza pan grippers.

In preparing pasta using the pan assembly, noodles are placed in the first insert pan 12, with sauce placed in the second insert pan 14. As will be discussed hereinafter, the pasta or noodle pan 12 includes a plurality of apertures extending therethrough. For cooking, a small amount of water is disposed in the outer pan, and the lid is placed over the outer pan. The assembly including the insert pans, outer pan, noodles, sauce and water together with the lid placed thereover are then inserted into an oven for cooking. The amount of water placed in the outer pan is sufficiently small, such that it is entirely transformed into vapor or steam during cooking, thereby providing for steam cooking of the noodles within the insert pan 12 via the plurality of apertures. Thus, the dimples 22 of the outer pan ensure that the bottom surface of the noodle pan 12 is maintained away from the inner bottom surface of the outer pan, to allow for proper steaming through the apertures of the pan 12 as the water becomes vaporized.

As discussed earlier, the amount of water is sufficiently small to allow for fairly rapid cooking, with the water transformed into a vapor rapidly after insertion into an oven. For example, 2-3 ounces of water has been found to be sufficient. Although it might not be necessary for the sauce pan 14 to be spaced from the bottom surface of the outer pan 10, the dimple arrangement can also prevent sticking of the insert pans to the bottom surface of the outer pan, for example if food should become spilled or boiled over during preparation and/or cooking. Further, the provision of dimples throughout the entire surface of the outer pan makes assembly of the pans in preparation for cooking easier, since the positions of the insert pans 12, 14 may be reversed, or in other words are non-specific. Still referring to FIG. 2A, it will be noted that a spacing is provided between an outer rim or brim portion 20d of the cover 20 and the rims or lips of the insert pans and outer pan 10a, 12a, 14a, as shown at 26. As a result, the lid can be easily placed upon the outer pan and insert pans (i.e. without a snap or lock), while the surface 20a ensures a sufficient seal about the pan. The spacing 26 makes placement of the cover substantially foolproof, such that the lid can be readily placed in a proper sealing position without requiring a great deal of time and/or attention.

Figure 2B:
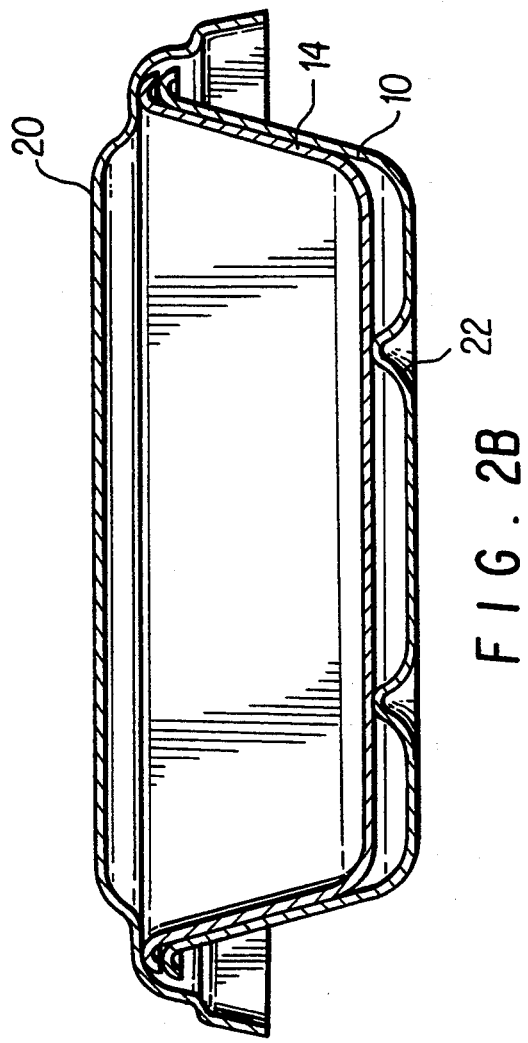

FIG. 2B shows a cross-sectional view of one end of the arrangement shown in FIG. 2A. As shown by a comparison of FIGS. 2A and 2B, the dimples 22 have a nipple-like shape. Although the dimples could be replaced by ridges or other shapes, in accordance with one aspect of the present invention, we have recognized the nipple-like shape as advantageous in maintaining the spaced relationship between the insert pans and the outer pan, while providing a relatively simple structure allowing the pans to be easily die pressed and easily cleaned.

Figure 3:
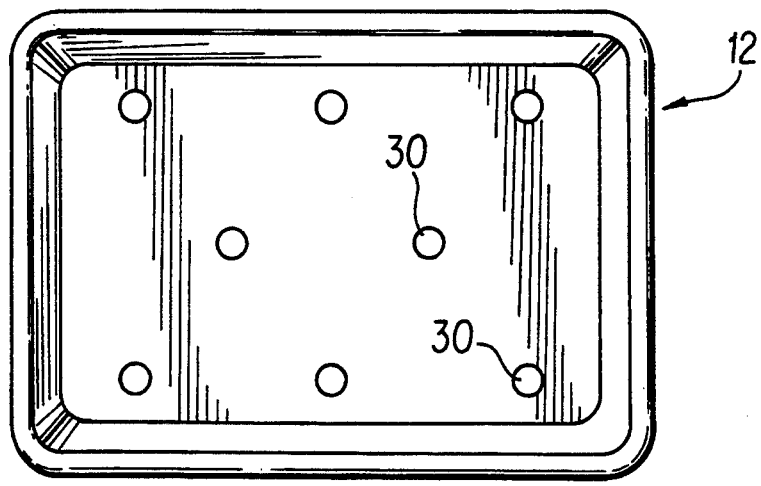
FIG. 3 is a plan view of a first insert pan.

As shown in FIG. 3, a plurality of apertures 30 are provided in the bottom portion of the pasta insert pan 12. As discussed hereinearlier, the apertures 30 allow the noodles to be cooked utilizing the steam or vapor which is provided by the small amount of water disposed in the bottom of the outer pan. In accordance with one aspect of the present invention, it has been recognized that the combined use of an apertured pan 12 and a non-apertured pan 14 allows for the simultaneous cooking of pasta and sauce within the outer pan 10. As shown in FIG. 3, a large number of holes is not necessary, and a relatively few larger holes is sufficient in allowing the noodles to be cooked by heat and steam, while maintaining a simple design which can easily be formed in a die. Although a larger number of holes can be provided, the die forming operation becomes more complicated. In addition, by contrast to a wire basket type arrangement, the insert pan 12 is inexpensive to manufacture, and relatively easy to clean.

Figure 4:
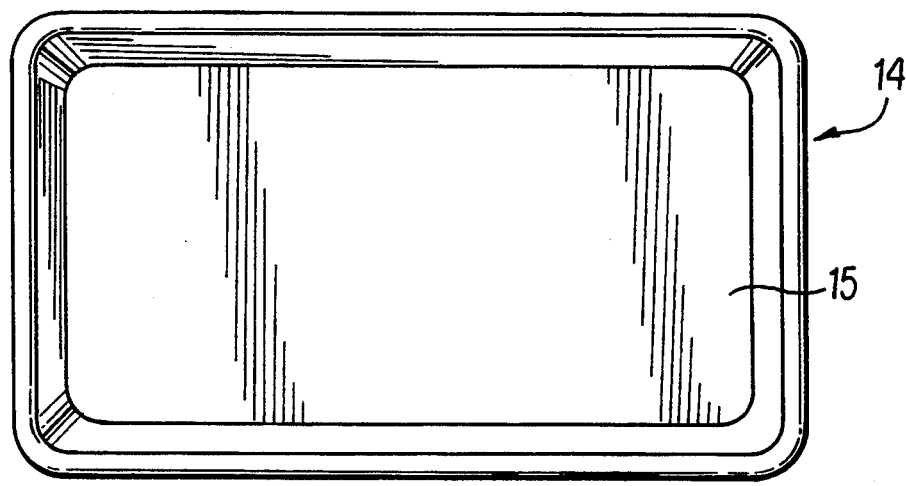
FIG. 4 is a plan view of a second insert pan.

By contrast to the pasta insert pan 12, the sauce insert pan 14 (FIG. 4) has a continuous bottom surface 15 and thus, the sauce can be readily maintained within the pan 14. In addition, at least partially due to the more enclosed structure of the sauce pan 14, the sauce can attain a greater temperature than the noodles, which we have recognized as desirable in the simultaneous cooking of pasta and sauce. For example, in simultaneously cooking pasta and sauce, the noodles are sufficiently cooked when they attain a temperature of 145° F.–165° F., while the sauce should attain a temperature of 180° F.–200° F. Although the sauce pan is shown as larger than the noodle or pasta pan, it is to be understood that the sizes can be varied depending upon the respective amounts desired for a particular recipe, or depending upon the particular entree being prepared.

Figure 5:
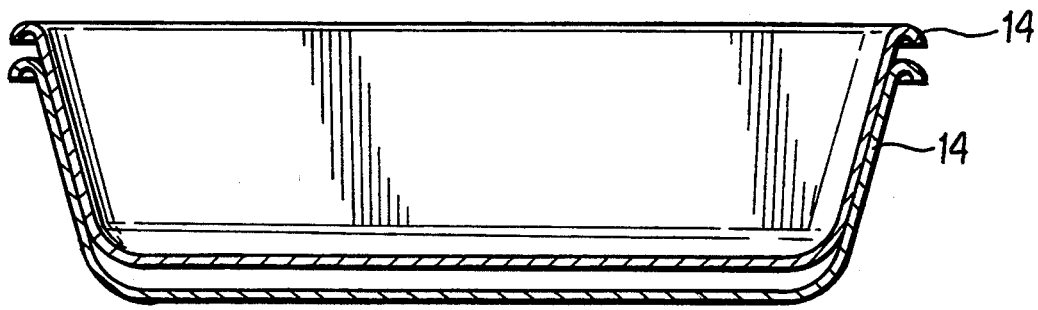
FIG. 5 illustrates the stacking convenience of the insert pans.

Referring to FIG. 5, it will be appreciated that both of the insert pans 12, 14 include a regular, somewhat tapered structure, allowing for easy stacking of the pans. In particular, the tapered or inclined side walls 14s allow the pans to be easily nested with respect to one another. Although this feature may be somewhat unimportant for certain applications, it is particularly important in the context of a fast food restaurant in which it may be necessary to maintain 50 or more pan assemblies on hand. If the assemblies are not able to be stored conveniently, the space requirements of such a large number of pan assemblies can become excessive.

Figure 6:
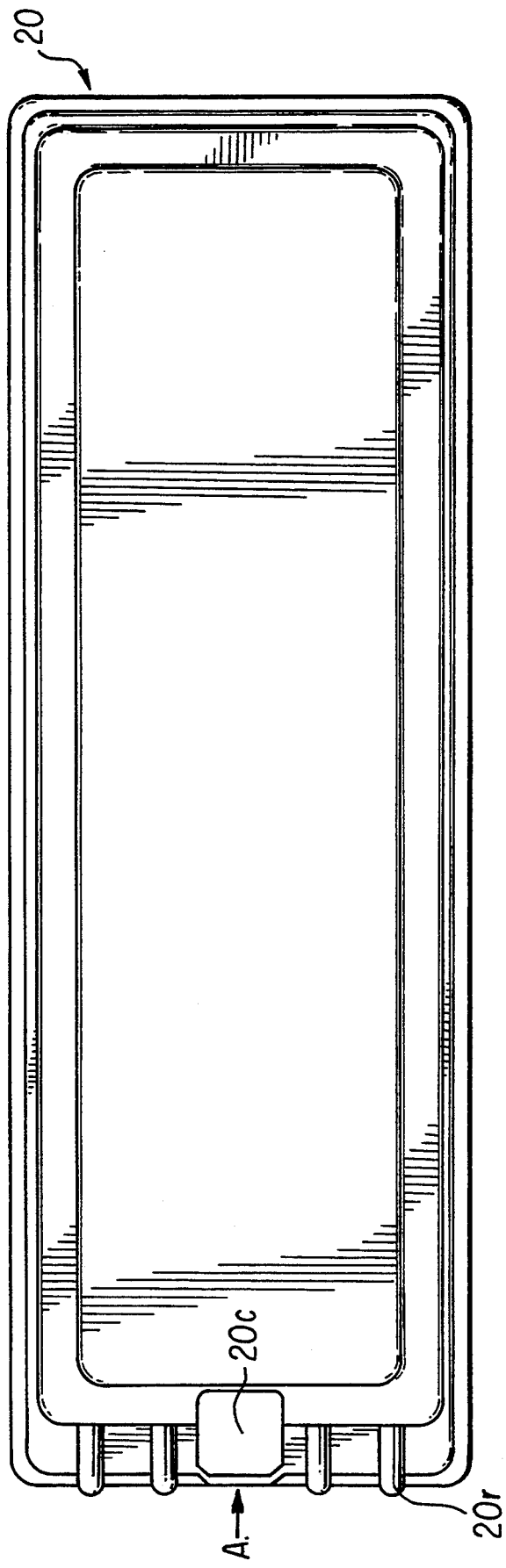
FIG. 6 is a plan view of the lid or cover for the carrier or outer pan.

Referring now to FIG. 6, the cover 20, which covers the outer pan and insert pans, is shown. As discussed earlier, the cover 20 is relatively loose fitting over the outer pan, thereby allowing the cover to be easily placed upon the outer pan in a foolproof manner. The outer pan, insert pans and cover can be formed relatively inexpensively, while maintaining durability for repeated use. An aluminum material, such as HO aluminum having a thickness of approximately 0.63 inches has been found to be sufficient. As also discussed earlier, the cover 20 includes an aperture 20c, thereby allowing a pizza pan gripper to be inserted through the cover 20c such that the outer pan 10 can be readily grasped. A plurality of ridges 20r are also provided at the edge which includes the aperture 20c, thereby ensuring adequate strength of the cover 20.

Figure 8:
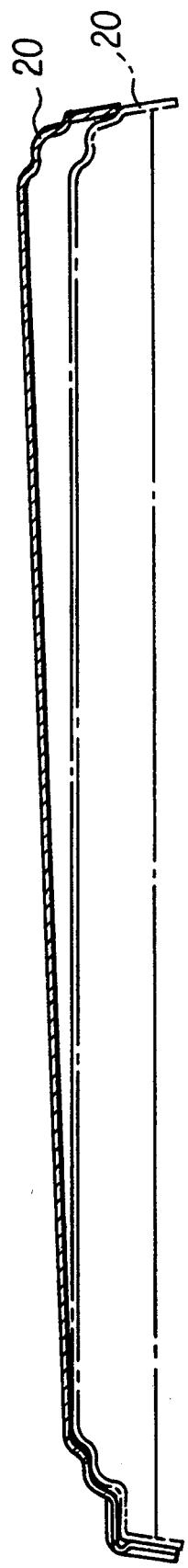
FIG. 8 illustrates the stacking convenience of the pan lids.
Figure 7:
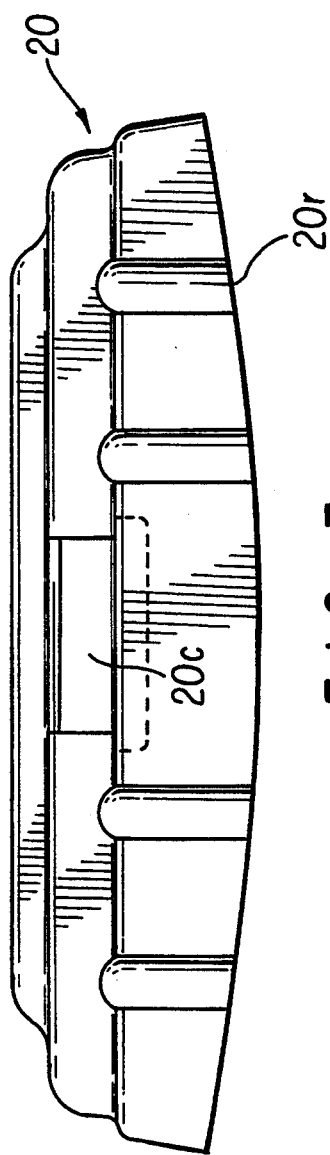
FIG. 7 is an end view of the lid of FIG. 6.

FIG. 7 shows an end view, from the direction A of FIG. 6, of the cover 20. As should be readily apparent, the ridges 20r provide for sufficient strength of the cover 20, with the aperture 20c allowing the outer pan 10 to be readily grasped, for example by pizza pan grippers. FIG. 8 illustrates the stacking convenience of the covers 20. Although the covers might not completely nest as do the insert pans and outer pans, sufficient nesting and stacking is attained to provide for compact storage.

Figure 9:
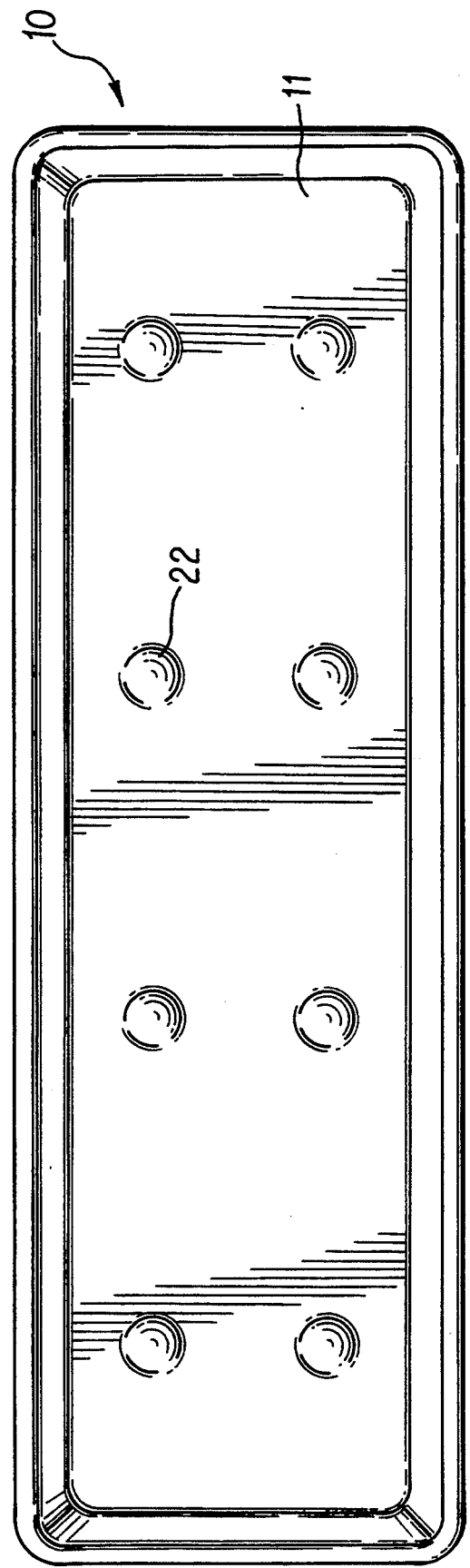
FIG. 9 is a plan view of the outer or carrier pan.
Figure 10:
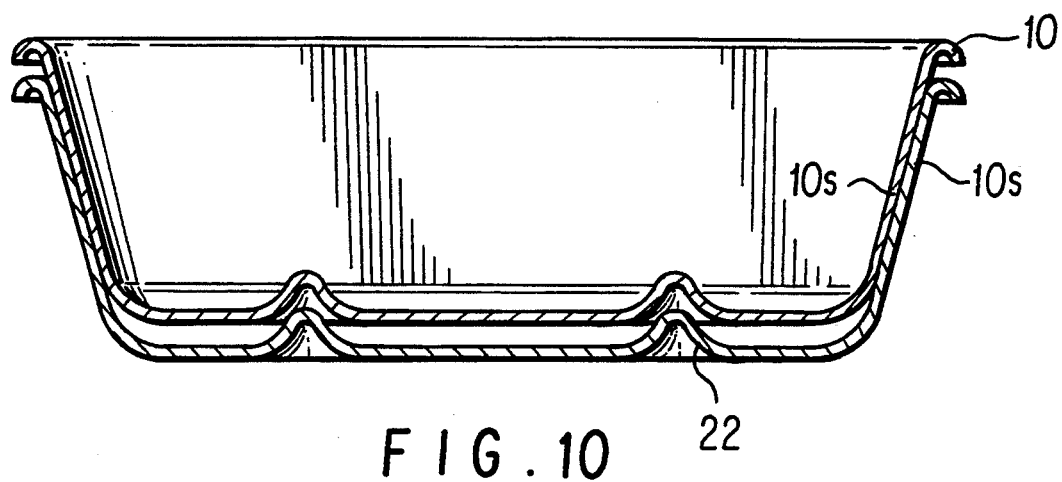
FIG. 10 illustrates the stacking convenience of the outer or carrier pans.

FIG. 9 shows a plan view of the outer pan 10, and illustrates the relatively simple dimple structure which can provide the spaced relationship between the bottom inner surface 11 of the pan 10 with respect to the bottoms of the insert pans 12, 14. FIG. 10 illustrates the stacking convenience of the outer pans 10, due to the relatively simple design, as well as the inclined wall portions 10s.

As should be readily apparent, the present invention provides a relatively simple structure, thereby providing for ease of manufacture, use and cleaning. The outer surfaces of the outer pan 10 and cover 20 are preferably provided with a black non-stick outer coating, thereby ensuring that the pan assembly absorbs heat rapidly during the cooking process. For example, a black coating which includes Teflon (trademark name for polytetrafluoroethylene) may be suitable. The outer surface of the sauce pan 14 also preferably includes the same coating, thereby allowing the insert pan 14 to be used for cooking separate from the rest of the assembly if desired. For the exterior surfaces of the outer pan 10, cover 20 and insert pan 14, Xylan #8461 has been determined to be suitable as a durable coating which includes PTFE, having a low surface friction, thereby providing easy handling and clean up. The interior of the sauce pan 14 should include a durable high release coating such as Chemlon #45135. The foregoing materials/coatings are recognized as safe for use on food contact surfaces. Although coatings may also be provided on the interior surfaces of the outer pan 10, cover 20 and/or the surfaces of the insert pan 12, coatings on these surfaces are currently not considered necessary, and may be omitted to reduce costs.

Thus, the present invention provides a convenient pan assembly and cooking method which can be utilized in fast food restaurants. The assembly and cooking method can be particularly desirable in pizza restaurants, since the pan assembly can be utilized in both radiant and convection type pizza ovens. For example, portions of pasta and sauce can be placed in the respective insert pans, with 2–3 ounces of water in the outer pan. When inserted into the oven with the cover over the assembly, after approximately 7–8 minutes, the pasta will reach a temperature of 145° F.–165° F., with the sauce reaching temperatures of 180° F.–200° F. The pan assembly can then be removed from the pizza oven, and the pasta and sauce combined for serving at the restaurant or for carry-out. It may also be desirable to provide separate containers for the pasta and sauce for carry-out. As mentioned earlier, although the sauce pan is shown as larger than the pasta pan, the relative sizes can be varied if desired. Typically, a greater portion of pasta will be provided as compared with the sauce, however the larger area for the sauce pan provides for cooking of the sauce to higher temperatures, while avoiding excessive temperatures of the noodles. For example, an arrangement in which the pasta pan is approximately 9 inches by 6 inches with a depth of approximately 1.7 inches, has been found suitable for a 14 ounce pasta portion, with a sauce pan of 9.8 inches by 6.3 inches with a depth of 1.7 inches suitable for approximately 12 ounces of sauce. For such an arrangement, the outer pan can have dimensions of approximately 20.6 inches by 6.4 inches, with a depth of 1.85 inches (of course sizes are provided by way of illustration and may vary).

The arrangement is quite convenient for use in fast food restaurants, since pasta and sauce portions can be prepared and stored in suitable serving sizes. Thus, the fast food employee can merely remove a desired number of bags from a refrigerator or freezer, and after allowing the portions to thaw (if necessary) the portions can be removed from the bags and placed into the respective insert pans. Thereafter, a small amount of water, for example a ladle of water can be placed in the outer pan, with the insert pans then placed in the outer pan and the assembly covered with the cover. The assembly can then be placed in a conventional pizza oven, and the pasta entree is sufficiently cooked in approximately 8 minutes.

By way of illustration, a typical preparation sequence will now be described. In the present example, 12–14 ounces of spaghetti will be prepared with approximately 12 ounces of sauce. First, a sauce ladle is filled to dust below the rim, or such that approximately 2–5 ounces of water is provided, with the water then poured into the bottom of the outer pan. It is important that only a small amount of water is provided, such that the water can rapidly transform into steam after the assembly is placed into the oven. The insert pans are then placed in the outer pan, and a pre-bagged portion of spaghetti, for example 12–14 ounces, is placed into the apertured insert pan. Two level ladles of sauce are then provided in the non-apertured insert pan, and the assembly is covered and placed in a pizza over for approximately 8 minutes.

Using pan grippers and an oven mit, the assembly can then be removed from the oven and placed on a landing table. The pasta can then be served with the sauce thereover, or the pasta can be portioned where it is desirable to serve portions which are smaller than 12–14 ounces. The sauce can be conveniently poured from the sauce pan 14, for example by using grippers to hold the sauce pan, and pouring the sauce such that it exits from a corner of the pan. The insert pans, outer pan and cover can then be conveniently immersed in soapy water, and also may be easily cleaned in a dishwasher.

As should be readily apparent from the foregoing, the present invention provides a convenient and reliable pan assembly which can be utilized for cooking a plurality of food components simultaneously. The arrangement is sufficiently simple and reliable, such that a pasta and sauce dish, as well as other entrees, can be prepared in a fast food restaurant, for example by utilizing the assembly to cook pasta and sauce in a pizza oven.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A pan assembly including:
   an outer pan;
   a first insert pan received within said outer pan, said first insert pan having a plurality of holes extending through a bottom surface thereof;
   a second insert pan received within said outer pan adjacent to said first insert pan;
   the pan assembly further including spacing means for spacing said bottom surface of said first insert bottom surface of said outer pan to thereby provide a space between said bottom surface of said outer pan and said bottom surface of said first insert pan, wherein said plurality of holes open into said space such that an interior of said first insert pan is in communication with said space by said plurality of holes, and wherein said bottom surface outer pan is non-apertured at least in a region disposed below said plurality of apertures of said first insert pan.

2. The pan assembly of claim 1, wherein said second insert pan includes a continuous bottom.

3. The pan assembly of claim 2, further including one of noodles, pasta and rice in said first insert pan, and a sauce in said second insert pan.

4. The pan assembly of claim 1, further including a lid for covering said outer pan.

5. The pan assembly of claim 4 wherein said lid includes a first surface containing a top periphery of said pan assembly including the outer pan and insert pans, said lid further including a domed portion providing a second surface of said lid at a height above said first surface when said lid is placed upon said outer pan and insert pans.

6. The pan assembly of claim 4, wherein said lid includes a first surface resting above a top periphery of said outer pan and insert pans, said lid further including a rim portion laterally spaced from an outer periphery of said outer pan when said lid is placed upon said outer pan.

7. The pan assembly of claim 1, further including a black non-stick coating provided on outer surfaces of said outer pan.

8. The pan assembly of claim 6, further including a black coating on outer surfaces of said outer pan.

9. The pan assembly of claim 1, wherein each of said first and second pans and said outer pan are separately stackable, such that each can be stacked in a nested configuration.

10. The pan assembly of claim 1, further including a lid for covering said outer pan, said lid including an opening to allow gripping of said outer pan through said opening.

11. The pan assembly of claim 10, wherein said first and second insert pans are sized with respect to said outer pan to allow a spacing between said adjacent first and second insert pans when said first and second pans are inside of said outer pan.

12. The pan assembly of claim 1, wherein said bottom surface of said outer pan is non-apertured in regions disposed below both of said first and second insert pans.

13. The pan assembly of claim 12, wherein said second insert pan includes non-apertured bottom and side surfaces.

14. The pan assembly of claim 13, wherein said spacing means spaces said bottom surface of said second insert pan from said bottom surface of said outer pan.

15. A pan assembly comprising:
   an outer pan having a bottom surface;
   a first insert pan for containing one of noodles, pasta and rice, said first insert pan including a plurality of apertures extending through a lower surface thereof;
   a second insert pan; and
   a lid for covering said outer pan and insert pans;
   the pan assembly further including spacing means for spacing said bottom surface of said outer pan from said lower surface of said first insert pan such that a space is provided between said bottom surface of said outer pan and said lower surface of said first insert pan, wherein an interior of said first insert pan is in communication with said space by said plurality of apertures, and wherein said bottom surface of said outer pan is non-apertured at least in a region disposed below said plurality of apertures of said first insert pan.

16. The pan assembly of claim 15, wherein said first and second insert pans are received adjacent each other within said outer pan.

17. The pan assembly of claim 15, wherein said lid includes an opening to allow grasping of said outer pan therethrough.

18. The pan assembly of claim 15, wherein said second insert pan includes non-apertured bottom and side surfaces.

19. The pan assembly of claim 18, wherein said bottom surface of said outer pan is non-apertured in regions disposed below both of said first and second insert pans.

20. The pan assembly of claim 19, wherein said spacing means spaces the bottom surface of said second insert pan from said bottom surface of said outer pan.

21. A pan assembly for simultaneous cooking of at least two components of an entree comprising:
an outer pan;
a first insert pan having a plurality of holes extending through a bottom surface thereof;
a second insert pan adjacent said first insert pan;
spacing means for spacing a bottom surface of said outer pan from the bottom surface of said first insert pan such that a space is provided between said bottom surface of said first insert pan and said bottom surface of said outer pan, and wherein said plurality of holes open into said space such that an interior of said first insert pan is in communication with said space by said plurality of holes, and wherein said bottom surface of said outer pan is non-apertured at least in a region disposed below said first insert pan; and
a lid for covering said outer pan.

22. The pan assembly of claim 21, further including one of pasta, noodles and rice in said first insert pan, and a sauce in said second insert pan.

23. The pan assembly of claim 21, wherein said lid includes a domed portion and a brim, said brim including an aperture to allow grasping of said outer pan through said brim.

24. The pan assembly of claim 21, further including a black, non-stick coating on an outer surface of said outer pan.

25. The pan assembly of claim 21, wherein each of said outer pan and said first and second insert pans are formed to be separately nestable with a plurality of respective outer pans, first insert pans and second insert pans.

26. The pan assembly of claim 21, wherein said second insert pan includes non-apertured bottom and side surfaces.

27. The pan assembly of claim 26, wherein said bottom surface of said outer pan is non-apertured in regions disposed below both of said first and second insert pans.

28. The pan assembly of claim 26, wherein said spacing means spaces the bottom surface of said second insert pan from said bottom surface of said outer pan.

* * * * *